3,629,236
METHOD FOR THE PRODUCTION OF 2-MERCAPTOINOSINE

Mikio Honjo, Kinichi Imai, and Kunio Kobayashi, Osaka-fu, Japan, assignors to Takeda Chemical Industries, Ltd., Osaka, Japan
No Drawing. Filed Aug. 14, 1969, Ser. No. 850,246
Claims priority, application Japan, Aug. 21, 1968, 43/59,690
Int. Cl. C07d 51/54
U.S. Cl. 260—211.5 R        4 Claims

ABSTRACT OF THE DISCLOSURE 2-mercaptoinosine is obtained in a high yield by reacting under mild reaction conditions 5-amino-1-β-D-ribofuranosyl-4-imidazolecarboxamide with an isothiocyanate having the formula:

$$R-N=C=S$$

wherein R stands for phenyl or halophenyl.

---

This invention relates to a novel and industrially feasible method for the production of 2-mercaptoinosine.

2-mercaptoinosine is useful as the starting material in the synthesis of various kinds of nucleic acid-related compounds such as guanosine-5'-phosphate, 2-methylthioinosine-5'-phosphate, 2-ethylthioinosine-5'-phosphate and the like. The method wherein the material is used in the preparation of such nucleic acid-related compounds is well known in the art. Additionally such nucleic acid-related compounds are commercially valuable and have well known utility.

As the method for the production of 2-mercaptoinosine, there has been previously known a method where 5-amino-1-β-D-ribofuranosyl-4-imidazolecarboxamide is reacted with an alkali salt of alkylxanthogenic acid. However, this known method is accompanied with drawbacks in that it must be carried out in a sealed vessel at a high temperature and therefore, a necessarily complicated procedure has to be followed. In addition the yield of the isolated 2-mercaptoinosine is not satisfactory. The known method is, therefore, not an industrially feasible method for the production of 2-mercaptoinosine.

It has been found by the present inventors that, when 5 - amino - 1 - β-D-ribofuranosyl-4-imidazolecarboxamide (hereinafter referred to as "AICA-riboside") is reacted with a specified isothiocyanate, 2-mercaptoinosine can be produced in a substantially quantitative yield under mild reaction conditions with employment of an open vessel, and the product can be recovered from the reaction mixture by a simple isolation procedure in a high isolation yield.

The principal object of the present invention is therefore to provide an industrially feasible method for producing 2-mercaptoinosine, which can be carried out in a simple procedure and results in a high yield of 2-mercaptoinosine.

The said object can be realized by reacting AICA-riboside with an isothiocyanate having the formula:

$$R-N=C=S$$

wherein R stands for phenyl or halophenyl. The halogen of the halophenyl can be Cl, Br, F or I and the group can be mono- or poly-halophenyl with mono-halophenyl being preferred. As the halogen, Cl and Br are preferred.

As the examples of the said isothiocyanate there may be specifically mentioned phenyl isothiocyante and p-chlorophenyl isothiocyanate. Generally speaking, it is preferable that, relating to AICA-riboside, an excess amount of the isothiocyanate, e.g. about 2 to 5 times the molar equivalent of the latter, be employed.

The reaction is preferably carried out in a solvent. As the solvent, any organic solvent can be employed insofar as it will not adversely affect the reaction. It is advantageous to employ pyridine, picolin and the like or a mixture thereof as the solvent. The reaction proceeds almost quantitatively under heating. It is advantageous to carry out the reaction at a temperature between about 100° C. and about 150° C. It may be possible to conduct refluxing at the boiling point of the solvent used.

Thus produced 2-mercaptoinosine is easily recovered in a high yield by a simple per se known manner. For example, after the reaction is completed the resultant precipitates are separated from the reaction mixture. The precipitates are recrystallized from an aqueous solution of alkali hydroxide to give crystalline alkali salt of 2-mercaptoinosine in a high yield.

The method of the present invention is advantageous because it results in a high over-all yield of 2-mercaptoinosine reaching about 90%. Moreover, the method of the present invention is industrially feasible over the known method, because the reaction of the present invention can be carried out with employment of an open vessel, while the known method necessarily requires employment of a sealed vessel.

For further explanation of the present invention, the following examples are given, wherein the relation between part(s) by weight and part(s) by volume corresponds to that between gram(s) and milliliter(s).

EXAMPLE 1

A solution of 5 parts by weight of AICA-riboside and 7 parts by volume of phenyl isothiocyanate in 200 parts by volume of pyridine is refluxed for 3.5 hours.

Pyridine is distilled off from the reaction mixture and the resulting residue is dissolved in 19.4 parts by volume of 1 N-aqueous potassium hydroxide solution, followed by the addition of 100 parts by volume of water and 50 parts by volume of chloroform. The mixture is shaken and the aqueous layer is separated. After being washed twice with 50 parts each by volume of chloroform, the aqueous layer is concentrated under reduced pressure to 20 parts by volume. To the concentrated solution is added 20 parts by volume of ethanol, and the mixture is cooled with ice to yield 6 parts by weight of potassium 2-mercaptoinosine as colorless prisms melting at 160° to 165° C. (decomposition). The yield is 89%.

EXAMPLE 2

A solution of 6 parts by weight of AICA-riboside and 12 parts by weight of p-chlorophenyl isothiocyanate in 40 parts by volume of pyridine is refluxed for 3.5 hours.

The resulting precipitates are separated from the reaction mixture. The precipitates are admixed with a solution of 1.45 parts by weight of potassium hydroxide in 10 parts by volume of water to yield 7.8 parts by weight of potassium 2-mercaptoinosine as colorless prisms. The yield is 90%.

What is claimed is:

1. A method for producing 2-mercaptoinosine, which comprises reacting 5-amino-1-β-D-ribofuranosyl-4-imidazolecarboxamide with an excess of an isothiocyanate having the formula $$R\text{—}N\text{=}C\text{=}S$$

wherein R stands for phenyl or halophenyl, in an organic solvent.

2. A method according to claim 1, wherein the isothiocyanate is phenyl isothiocyanate.

3. A method according to claim 1, wherein the isothiocyanate is p-chlorophenyl isothiocyanate.

4. A method according to claim 1, wherein the reaction is carried out at a temperature between about 100° C. and about 150° C.

References Cited

UNITED STATES PATENTS

| | | | |
|---|---|---|---|
| 3,332,935 | 7/1967 | Yamazaki et al. | 260—211.5 |
| 3,337,528 | 8/1967 | Saito et al. | 260—211.5 |

LEWIS GOTTS, Primary Examiner

J. R. BROWN, Assistant Examiner